June 10, 1941.  H. W. SIMPSON  2,245,447
TRACTOR-MOWER ASSEMBLY
Filed Oct. 30, 1939  3 Sheets-Sheet 1

INVENTOR.
HOWARD W. SIMPSON
BY
ATTORNEYS

June 10, 1941.   H. W. SIMPSON   2,245,447
TRACTOR-MOWER ASSEMBLY
Filed Oct. 30, 1939   3 Sheets-Sheet 3

INVENTOR.
HOWARD W. SIMPSON
BY
ATTORNEYS

Patented June 10, 1941

2,245,447

UNITED STATES PATENT OFFICE 2,245,447

TRACTOR-MOWER ASSEMBLY

Howard W. Simpson, Dearborn, Mich., assignor to Detroit Harvester Company, Detroit, Mich., a corporation of Michigan Application October 30, 1939, Serial No. 302,043

9 Claims. (Cl. 56—25)

The present invention relates to a tractor mower assembly and more particularly to a wide tread track-laying type of tractor with a mowing machine attachment at the front end.

The assembly comprises essentially a wide tread track-laying type of tractor having an adjustable mower assembly supported adjacent the front end thereof and connected to a power take-off for power drive of the mowing mechanism. Means are provided for counterbalancing a large portion of the weight of the mower assembly directly from one of the track elements instead of from the tractor frame. The cutter bar is supported for adjustment to cut at all vertical angles from 45° downward to 90° upward without binding. Automatic means are also provided which are effective to disengage the clutch so as to stop forward advance of the tractor when the cutter bar of the mower assembly strikes an obstacle. The cutter bar is mounted to a frame element by an especially designed split hinge bearing which greatly facilitates attachment and removal of the cutter bar to the supporting element.

With the foregoing general description in mind, it is an object of the present invention to provide a mower assembly at the front of a crawler tractor.

It is a further object of the present invention to provide a mower of the type described which is adapted to cut throughout a wide range of vertical adjustments.

It is a further object of the present invention to provide a mower of the type described on a crawler tractor, together with means for counterbalancing or supporting a major portion of the weight of the mower assembly directly from the track frame rather than from the tractor.

It is a further object of the present invention to provide a mower assembly in combination with a tractor in which means are provided for automatically disengaging the clutch of the tractor when the cutter bar of the mower strikes an obstacle.

It is a further object of the present invention to attach a cutter bar of a mower assembly to a supporting element by a readily separable split hinge bearing to provide for ease of assembly.

Other objects of the invention will be apparent as the description proceeds, and when taken in conjunction with the accompanying drawings wherein:

Figure 4 is a vertical section through the hinge bearing and crank shaft assembly;

Figure 7 is a section on the line 7—7, Figure 2.

Figure 1:
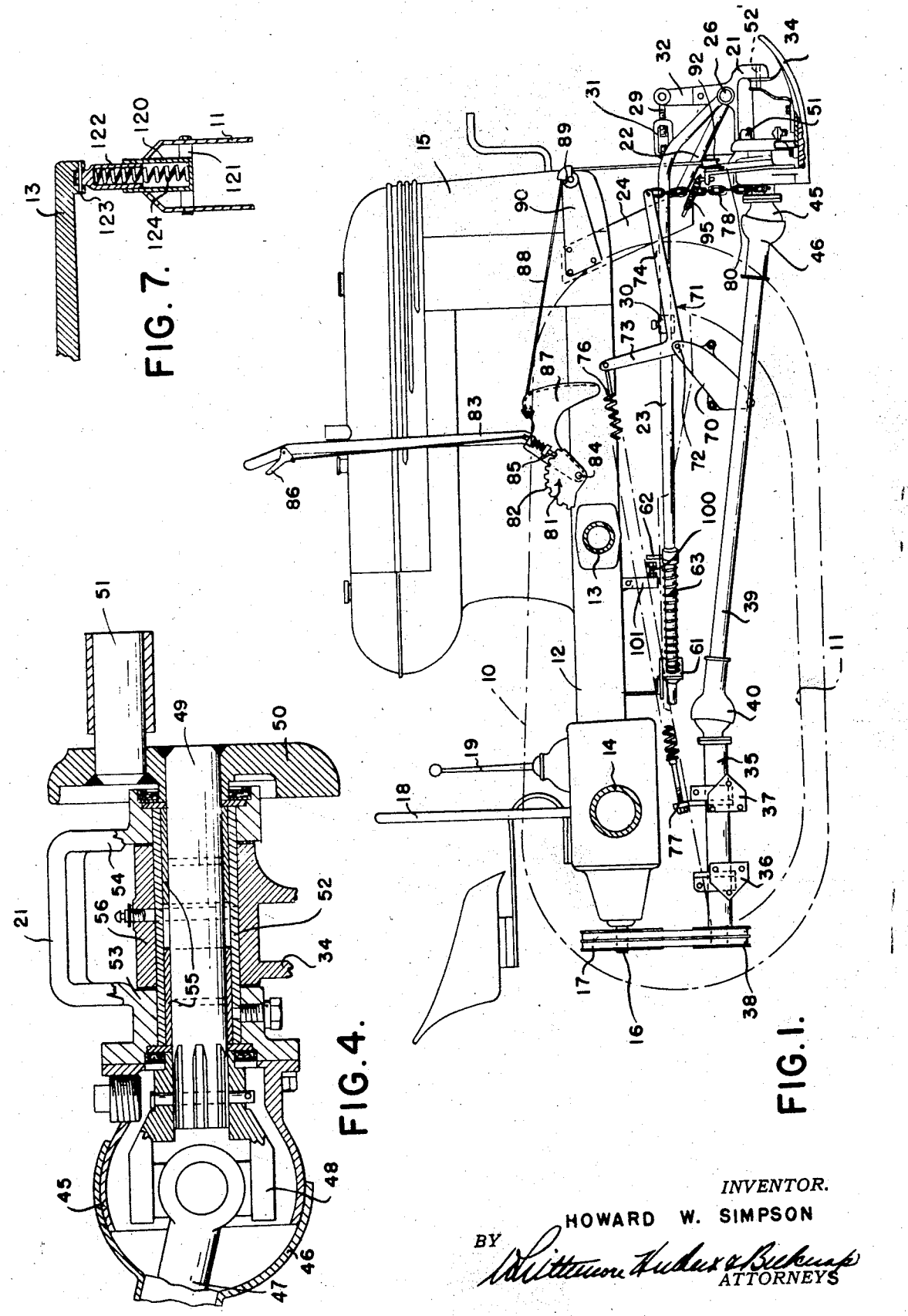
Figure 1 is a side elevation partly in section showing the tractor mower assembly.
Figure 2:
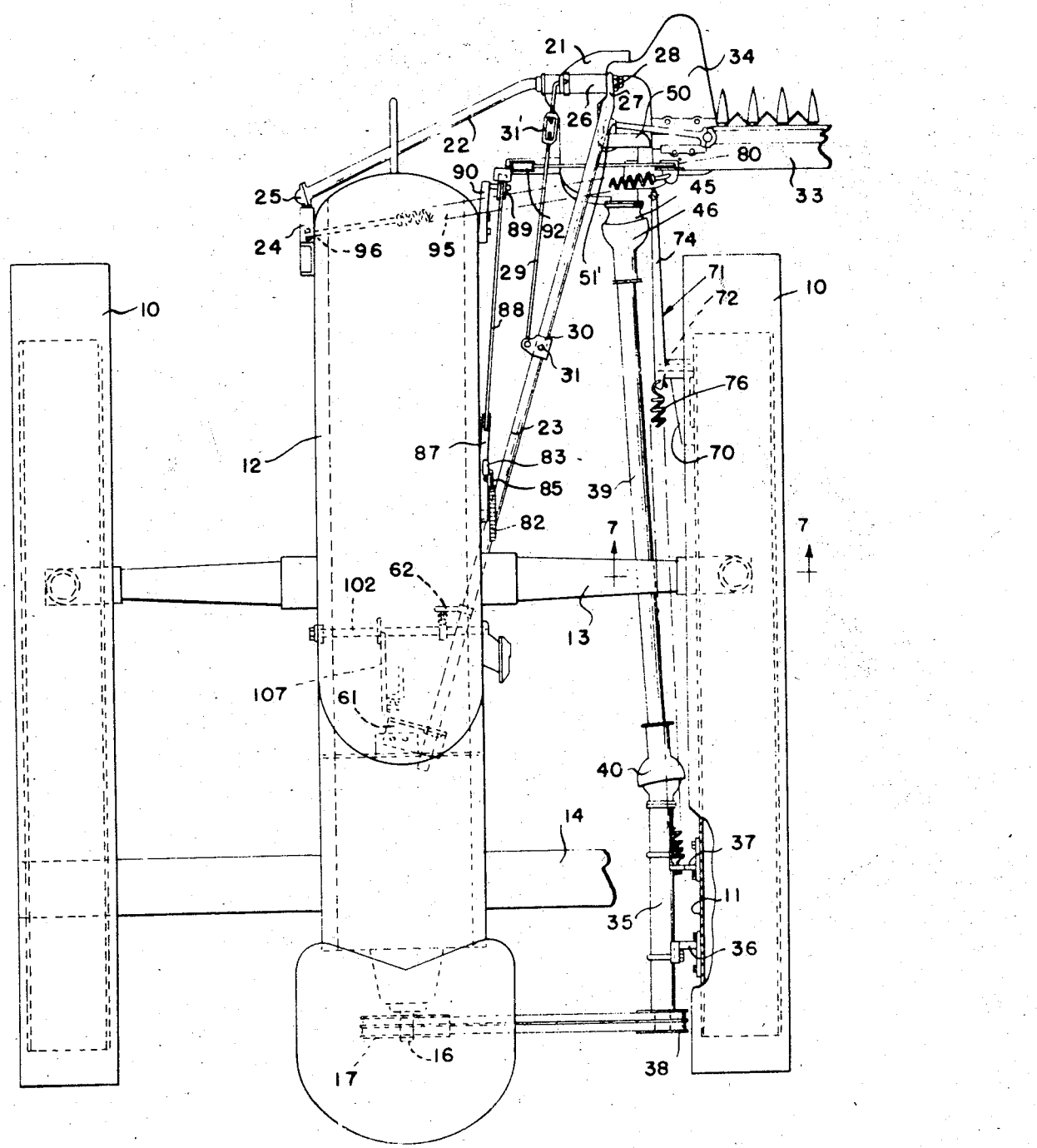
Figure 2 is a top plan view with parts broken away of the same tractor mower.

The tractor which forms a part of the present combination is of the wide tread track-laying type, and is shown as having endless tracks 10 mounted on suitable track frames indicated in Figure 1 at 11. The main frame of the tractor is shown in Figure 2 at 12 and is supported from the track frames by a front axle housing 13 and a rear axle housing 14. The main frame 12 of the tractor has a motor housing 15 in which an internal combustion engine is provided. The internal combustion engine, as is well understood, is adapted to drive the tractor forward or reversely, and also may be connected to a power take-off shaft 16 to which is connected a sheave 17 or the like.

In Figure 1 I have illustrated a steering brake of the conventional type at 18, and a gear shift at 19. A conventional clutch is provided for connecting and disconnecting the motor of the tractor from the track drive. This clutch is operatively connected to a clutch pedal 20 shown in Figure 6.

Figures 3, 5, 6:
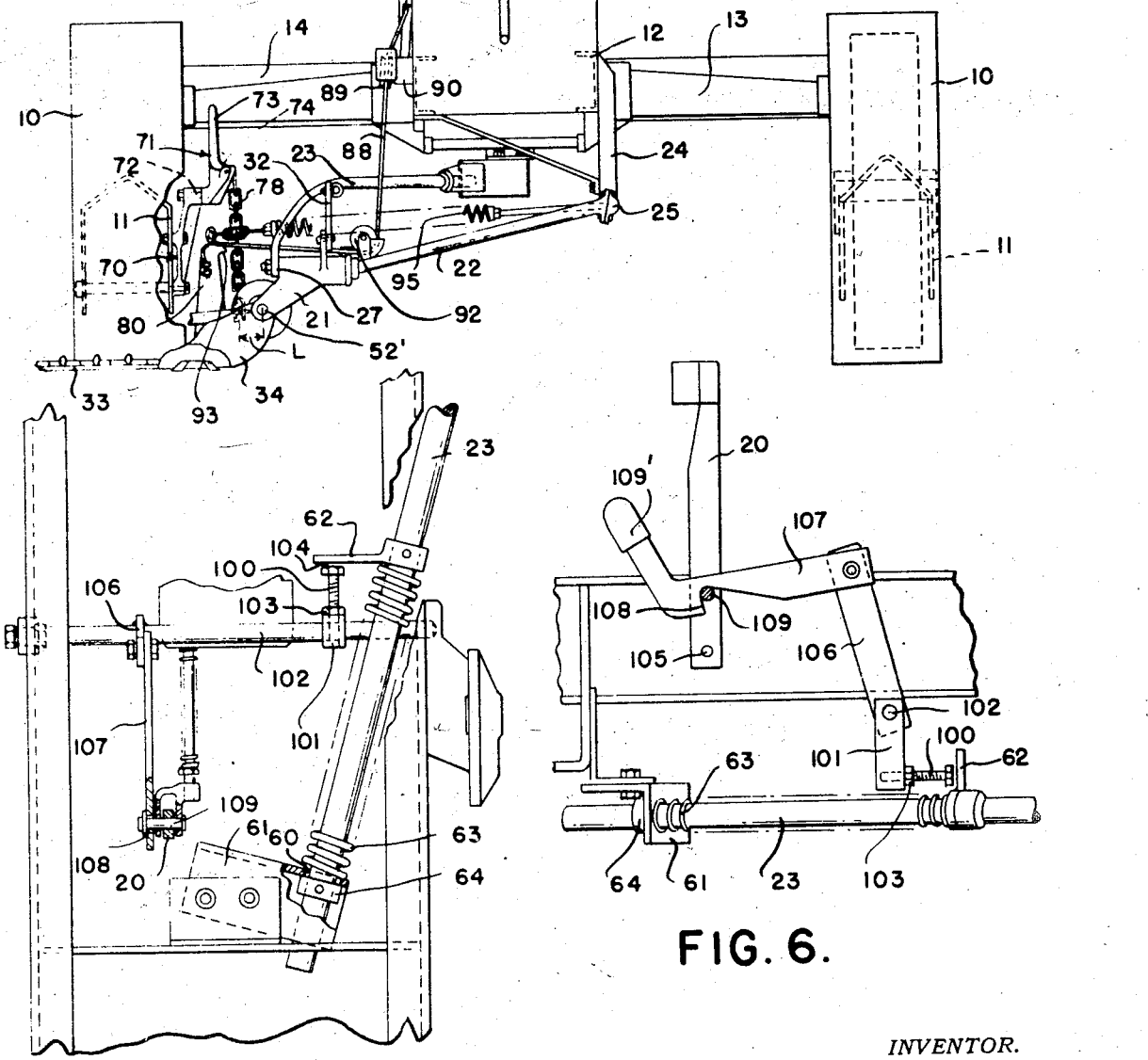
Figure 3 is a front elevation of the tractor mower.
Figure 5 is a fragmentary plan view showing the clutch release mechanism.
Figure 6 is a fragmentary side elevation of the clutch release mechanism.

The mower assembly and the associated mechanism is best illustrated in Figures 1 to 3.

Adjacent the front of the tractor, and as illustrated in the present application adjacent the right front corner thereof, I provide a hinge casting 21 which serves as the main frame of the mower mechanism. The hinge casting 21 is supported on the frame of the machine by means of a pair of bars, a front supporting bar being indicated at 22, and a rear supporting bar being indicated at 23. The front supporting bar 22 is mounted on a bracket 24 by means of a universal connection 25 which permits the bar 22 to move freely relative thereto.

The opposite end of the bar 22 is connected to the hinge casting 21 by means of a hinge housing 26 which permits pivoting movement of the hinge casting about the axis of the hinge housing 26.

The rear supporting bar 23 is connected to the hinge casting at its forward end so as to permit pivoting movement of the hinge casting 21 about the axis of the hinge housing 26. In Figure 2 I have illustrated the connection as taking the form of an eye 27 and threaded nuts 28 for securing the bars 22 and 23 to the hinge housing 26. By referring to Figures 1, 2 and 3 it will be noted that the bar 22 extends through the housing 26 and through the eye 27 of the bar 23.

The rear end of the supporting bar 23 passes through an aperture 60 in a bracket 61. The bar 23 has adjustably clamped thereto a lever 62 which serves as a clutch release element, as will later be described. In addition to this function, the lever 62 also serves as a spring seat for a coil shock spring 63. The other end of the spring seats against the bracket 61. As will be evident, the spring 63 continuously urges the bar 23 forwardly. The spring is selected so as to have sufficient strength to retain the bar 23 in extreme forward position as determined by a stop element 64 carried by the bar 23 at the rear of the bracket 61. However, upon abnormal strain, such as would be caused by the mower assembly upon encountering an obstacle, the rod 23 moves rearwardly compressing the spring 63 and actuating the clutch in a manner which will subsequently be described.

In order to provide for pivoting movement of the hinge casting 21 about the axis of the hinge housing 26, I provide an adjusting rod 29 carrying a clamping bracket 30 which is slidable on the rear supporting bar 23. Suitable locking means, such as a set screw 31 or the like, is provided to lock the bracket 30 in adjusted position on the bar 23. In addition, turnbuckle adjusting means are provided at 31'.

Referring more particularly to Fig. 1, the hinge bracket 21 has an upwardly projecting arm 32 thereon to which the forward end of the adjusting rod 29 is pivotally secured. As will be evident, adjustment of the rod 29 relative to the rear supporting bar 23, or adjustment of turnbuckle 31', will cause pivotal movement of the hinge bracket 21 about the axis of the hinge housing 26. This adjustment provides for controlling the closeness of cut taken by the mower assembly, as will be readily evident.

The mower assembly includes a cutter bar 33 in which is mounted a sickle bar of the usual type. As is well understood, the sickle bar is mounted for rapid reciprocation in a direction parallel to the length of the cutter bar, and cooperates therewith to cut grass or the like.

At the inner end of the cutter bar is provided an inner shoe 34 to which the cutter bar is rigidly secured. The inner shoe 34 is pivotally connected to the hinge bracket 21 for movement relative thereto in a vertical direction. This means will subsequently be described in detail.

As previously indicated, means are provided for reciprocating the sickle bar from the power take-off of the tractor. In Figures 1 and 2 I have illustrated a countershaft housing 35 mounted on the track frame 11 by brackets 36 and 37. The countershaft housing supports a countershaft to which is secured a sheave 38 which is aligned with the sheave 17 carried by the power take-off shaft 16. The two sheaves are interconnected by suitable means, such for example as V-belts or the like. It should be noted that housing 35 is thus more nearly aligned with housing 39.

The countershaft is provided at its opposite or forward end with a universal connection to a propeller shaft received within the propeller shaft housing 39. The universal joint is protected against the ingress of dirt or other foreign matter by a universally adjustable sleeve 40 which is carried by the propeller shaft housing.

Means are provided for permitting a slight rearward movement of the hinge casting 21 if the mower assembly encounters an obstacle, and to permit this rearward movement without disrupting the driving connection between the power take-off and the mower assembly the propeller shaft is provided with slidably associated splined elements (not shown) to permit this rearward movement.

The means for connecting the propeller shaft to the sickle bar, in order to cause reciprocation thereof, is best seen in the detailed view of Figure 4. The hinge casting 21 is provided with a spherically formed shell 45, and the forward end of the propeller shaft housing is provided with a correspondingly spherically shaped housing element 46 for protecting a universal driving connection contained therein.

In Figure 4 the propeller shaft is indicated at 47 and is connected by means of a universal driving joint 48 to a crank shaft 49. Crank shaft 49 at its opposite end carries a counterweight fly wheel 50 having a crank arm 51 secured thereto. The crank arm 51 is connected by a suitable pitman connection 51' to the sickle bar and, as will be evident, rotation of the fly wheel 50 causes a corresponding reciprocation of the sickle bar.

Reference has previously been made to a split hinge bearing between the hinge castings and the inner shoe of the mower assembly.

This is illustrated in Figure 4, in which a portion of the inner shoe 34 is shown. The upper portion of the inner shoe is provided with a half round recess for the reception of a sleeve 52 which spans two webs 53 and 54 of the hinge casting 21. The crank shaft 49 passes through the sleeve 52, and suitable bearings 55 are provided therein. A removable half round cap piece 56 is provided as a part of the inner shoe assembly, and is adapted to cooperate with the aforementioned half round recess at the top of the cap piece proper to receive the sleeve 52 therein. As will be evident, in order to remove the mower assembly from the tractor, it is necessary only to remove the cap piece 56 and to disconnect the pitman connection 51' and pivot connection 52' (Figure 1). This arrangement provides for ready association and disassociation of the mowing mechanism with the tractor.

The means for supporting the hinge casting, as thus far described, permit the same to move in a generally vertical direction relative to the tractor. The front supporting bar 22, as previously described, is provided with a universal connection 25, and the rear supporting bar 23 passes through an enlarged aperture 60 in the bracket 61 which is of sufficient size to permit pivoting as well as slidable movement of the bar 23 relative thereto.

In order to support the weight of the mower assembly, a counterbalancing means is provided which is adapted to counterbalance the major portion of the weight directly from the right-hand track frame. In Figures 1 and 2 I have illustrated a bracket 70 secured to the inner side of the right-hand track frame, and a bell crank 71 is pivotally connected thereto as indicated at 72. The bell crank 71 has a generally upwardly extending arm 73 and a generally forwardly extending arm 74. A counterbalancing spring 76 is connected between the arm 73 of the bell crank and the bracket 37, previously described. At 77 I have indicated suitable means for adjusting the tension of the counterbalancing spring 76.

The forwardly extending arm 74 of the bell crank 71 is connected by a cable or chain 78 to the inner shoe 34.

Referring now particularly to Figure 3, it will be observed that the cable or chain 78 is connected to the inner shoe 34 at a point outwardly removed from the pivot connection 52' provided coaxially with the crank shaft 49, thus providing a lever arm which is indicated in Figure 3 as L. As a result of this, the counterbalancing effect of the spring 76 serves a dual function. In the first place, it directly counterbalances a large portion of the weight of the entire mower assembly and urges the hinge casting 21 upwardly. However, since the connection of the chain or cable 78 is directly to the inner shoe, and since a short lever arm L is provided, there is also a counterbalancing effect tending to pivot the mower arm 33 upwardly.

Means are also provided for adjusting the vertical position of the cutter bar so as to enable the apparatus to cut on side hills and the like. This means is well illustrated in Figure 3 in which I have illustrated a vertical lever 80 rigidly secured to the inner shoe 34. A bracket 81 having a toothed quadrant is provided on the frame of the tractor, and a hand lever 83 is pivoted thereto, as indicated at 84, in a position to be readily accessible to the driver of the tractor. The spring pressed dog 85 is associated with the lever 83, and is adapted to engage the teeth of the quadrant 82. A suitable hand-operated release for the dog 85 is indicated at 86. Associated with the lever 83 is a quadrant 87 to which is secured a cable 88 for adjusting the vertical position of the cutter bar 33. The cable 88 leads over a pulley 89 carried by a pulley support or bracket 90, which in turn is carried by the main frame of the tractor adjacent the forward end thereof. As best seen in Figure 3, the cable 88 continues downwardly and passes under a pulley 92 which is carried by the hinge casting 21. The cable 88, at its opposite end, is connected to the vertical lever 80, previously referred to. As will be evident, rearward motion of the hand lever 83 will pivot the inner shoe 34 about its fore and aft axis, lifting the cutter bar to any desired position.

The vertical lever 80 is provided with a nose-piece 93 which eventually will engage a portion of the hinge casting to serve as a stop means. By suitably proportioning the parts, the engagement between the nose-piece 93 and the hinge casting 21 will take place when the cutter bar is substantially vertical. Further rearward movement of the hand lever 83 will result in a substantially direct lifting movement on the hinge casting through the medium of the pulley 92. This will lift the inner shoe upwardly in a position to clear the ground, as is desirable when it is necessary to move the tractor for considerable distances without performing the mowing operation.

Other means are provided for supporting a portion of the weight of the cutter bar during normal operation, and takes the form of a cutter bar counterbalance spring 95. The spring 95 is secured to the bracket 24, previously referred to, as indicated at 96, and if desired suitable conventional means may be provided for adjusting the tension of the spring 95. The opposite end of the spring 95 is secured adjacent the top of the vertical lever 80 carried by the inner shoe 34 of the mower. As will be evident, tension of the spring 95 exerts a clockwise movement on the cutter bar 33.

As thus far described, it will be observed that the hinge casting which serves as the main frame for the mower assembly is connected directly to the main frame of the tractor by means of the front supporting bar 22 and the rear supporting bar 23. This connection positions the hinge casting but permits substantial vertical movement thereof. This vertical movement of course takes place about an axis passing through the universal pivot 25 of the front supporting bar 22 and the aperture 60 in the bracket 61. In addition the hinge housing is carried by these bars in such a manner as to permit adjustment thereof about a horizontal transverse axis. This adjustment is effected by the adjusting rod 29 in a manner previously described. The cutter bar 33 is pivoted to the hinge casting about a fore and aft axis coinciding with the axis of the crank shaft 49. Means are provided permitting slight rearward movement of the hinge casting upon overcoming the resistance of the compression spring 63. The weight of the mower assembly is largely supported by the counterbalancing spring 76, and this spring is also effective in part to counterbalance the weight of the cutter bar 33. The cutter bar counterbalance spring 95 also assists in counterbalancing the weight of the cutter bar 33, with the result that the cutter bar will rest comparatively lightly on the ground. Means are also provided which are effective, first to swing the cutter bar 33 vertically about the axis of the crank shaft to an extreme upwardly position, and effective thereafter to elevate the hinge casting to a position clear of the ground.

As previously indicated, means are provided for disengaging the clutch in the transmission of the tractor so as to insure stoppage of the tractor if the cutter bar encounters an obstacle. Referring now particularly to Figures 5 and 6, I have illustrated the rear supporting bar 23, the bracket 61, and the compression spring 63. As will be evident, the compression spring 63, acting between the bracket 61 and the lever 62, retains the bar 23 in extreme forward position as determined by the stop 64, unless the cutter bar encounters an obstacle. At this time the bar 23 moved rearwardly compressing the spring 63, and the lever 62 engages an adjustable abutment 100 carried by an arm 101, keyed or otherwise secured to a cross shaft 102. I have illustrated the adjustable abutment as in the form of a bolt having a locking nut 103. Normally the abutment 100 is adjusted so that a slight clearance, such as indicated at 104, is present between the abutment and the lever 62.

In Figure 6 I have illustrated the clutch pedal 20 as pivoted at the point 105. Secured to the cross shaft 102 is a second lever 106, also keyed or otherwise secured thereto for movement therewith. A hooked member 107 is pivotally secured adjacent the free end of the lever 106 and is provided with a hooked portion 108 adapted to engage a pin 109 projecting laterally from the clutch pedal 20. As will be evident, when the bar 23 is moved rearwardly, the shaft 102 is rotated in a clockwise direction, as seen in Figure 6, with the result that the hooked portion 108 of the hooked member 107 will depress the clutch pedal, thus arresting forward movement of the tractor.

In order to reengage the clutch so as to reverse the tractor, the hooked member 107 is provided with a handpiece 109', by means of which the hooked member 107 can be released from the clutch pedal. As will be evident, the hooked member 107 will be disengaged by the hand-piece in a manner to permit reengagement of the clutch only after the tractor has been taken out of gear or placed in reverse.

It may be pointed out here that by supporting the hinge casting 21 from a bracket 70 mounted on one of the track frames 11 an improved performance is provided. The tractor frame 12 is mounted on the track frames 11 by a pivot connection for the rear axle 14, and by a resilient connection for the front axle 13 best shown in Figure 7.

In this figure I show the front axle secured to track frames 11 by a resilient connection comprising a spring housing 120 carried by a suitable bracket 121 mounted in the track frame. A cooperating plunger spring housing 122 is pivoted to the axle 13 as indicated at 123, and housings 120 and 122 receive a compression spring 124. Thus while the track frames 11 follow the contour of the ground, the tractor frame 12 will shift relative thereto. By supporting the hinge casting 21 from the track frames 11, the mower assembly will thus follow the ground contour.

As previously stated, the rearward movement of the hinge casting is permitted by a suitable telescoping arrangement of the propellor shaft and its housing. Thus the described arrangement serves two functions: first, the rearward swinging movement of the cutter bar upon striking an obstacle relieves the shock on the whole mower; and secondly it provides a movement which is used to automatically release the clutch of the tractor and thus stop its forward movement.

By positioning the mowing mechanism substantially at the front of the tractor it is possible to cut a square corner in a hay field without backing up the tractor. Furthermore the tractor itself does not have to travel past the end of the standing corner of the hay field and by turning before he gets to the corner, the operator is then in position to continue on the next right angle side of the field without delay. The described arrangement is simple and easy to construct and assemble. In addition it offers substantial advantages in normal operation.

Accordingly, while I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. In a crawler tractor mower assembly, the combination with a crawler tractor having a pair of track frames, and a main frame carried thereby, of a mower frame, supporting bars secured to the main frame for mounting said mower frame for substantially vertical movement, a cutter bar pivoted to said mower frame for vertical swinging movement, and resilient means acting upwardly on said cutter bar at a point adjacent the pivot connection of said cutter bar to said mower frame, whereby to partly counterbalance both the pivot action of said cutter bar and the weight of said mower frame and cutter bar, said resilient means comprising a bell crank pivoted to the adjacent track frame, a tension spring anchored at one end of said track frame and at the other end to one arm of said crank, and a substantially vertical tension member connecting the other end of said crank to said cutter bar.

2. In a crawler tractor mower assembly, the combination with a crawler tractor having a pair of laterally spaced track frames and a main frame carried thereby, of a mower assembly in front of said tractor, supporting bars for the mower assembly carried by the main frame, one having a universal connection with the main frame, and the other having a combined sliding and pivotal connection with the main frame, and means carried by one of the track frames for counterbalancing most of the weight of the mower assembly.

3. In a crawler tractor mower assembly, the combination with a crawler tractor having a pair of laterally spaced track frames and a main frame between and carried thereby, of a mower assembly in front of one of said track frames and spaced laterally outward relative to the main frame, connections between the mower assembly and main frame including a transversely extending bar in front of the main frame, and a longitudinally extending bar, one end of the transverse bar being universally connected to said main frame at the side thereof remote to the mower assembly, the other end of said transverse bar being pivotally connected to said mower asembly, one end of the longitudinal bar being pivotally connected to the mower assembly, and the other end of said longitudinal bar having a combined sliding and pivotal connection with the main frame adjacent the rear end thereof, and means carried by one of said frames for counterbalancing most of the weight of the mower assembly.

4. In a crawler tractor mower assembly, the combination with a crawler tractor having a pair of laterally spaced track frames and a main frame carried thereby, of a mower assembly adjacent said tractor, supporting means for the mower assembly carried by the main frame, brackets carried by one of the track frames at spaced points longitudinally thereof, and means for counterbalancing most of the weight of the mower assembly including a bell crank lever carried by one of the brackets, a coil spring terminally connected to one arm of said bell crank lever and to the other bracket, and a flexible member terminally connected to the other arm of the bell crank lever and to said mower assembly.

5. In a crawler tractor mower assembly, the combination with a crawler tractor having a pair of laterally spaced track frames and a main frame carried thereby, of a mower assembly adjacent said tractor, supporting means for the mower assembly carried by the main frame, and means for counterbalancing most of the weight of the mower assembly including a bell crank lever pivotally connected to one of the track frames, a coil spring terminally connected to one arm of said bell crank lever and to the track frame mentioned, and a flexible member terminally connected to the other arm of the bell crank lever and to said mower assembly.

6. In a crawler tractor mower assembly, the combination with a crawler tractor having a pair of laterally spaced track frames and a main frame carried thereby, of a mower assembly adjacent the tractor and including a reciprocating sickle bar, drive means for the sickle bar including a countershaft, a housing for the countershaft, spaced supporting brackets for the housing carried by one of the track frames, supporting means for the mower assembly carried by the main frame, another bracket secured to the track frame aforesaid, and means carried by the last mentioned bracket and one of the spaced supporting brackets for the countershaft housing for counterbalancing most of the weight of the mower assembly.

7. In a crawler tractor mower assembly, the combination with a crawler tractor having a pair of laterally spaced track frames and a main frame crried thereby, of a mower frame adjacent and mounted to swing vertically relative to the tractor, a cutter bar pivoted to said mower frame for vertical swinging movement, and resilient means acting upwardly on said cutter bar at a point adjacent the pivot connection of said cutter bar to said mower frame, whereby to partly counterbalance both the pivot action of said cutter bar and the weight of said mower frame and cutter bar, said resilient means comprising a bell crank pivoted to the adjacent track frame, a tension spring anchored at one end to said track frame and at the other end to one arm of said bell crank, and a substantially vertical tension member connecting the other end of said crank to said cutter bar.

8. In a crawler tractor mower assembly, the combination with a crawler tractor having a pair of laterally spaced track frames and a main frame carried thereby, of a mower assembly in front of one of said track frames and spaced laterally outward relative to the main frame, and connections between the mower assembly and main frame including a transversely extending bar in front of the main frame, and a longitudinally extending bar, one end of the transverse bar being universally connected to said main frame at the side thereof remote to the mower assembly, the other end of said transverse bar being pivotally connected to said mower assembly, one end of the longitudinal bar being pivotally connected to the mower assembly, and the other end of said longitudinal bar having a combined sliding and pivotal connection with the main frame adjacent the rear end thereof.

9. In a crawler tractor mower assembly, the combination with a crawler tractor having a pair of laterally spaced track frames and a main frame carried thereby, of a mower assembly in front of said tractor, and supporting bars for the mower assembly carried by the main frame, one having a universal connection with the main frame, and the other having a combined sliding and pivotal connection with the main frame.

HOWARD W. SIMPSON.